(12) United States Patent
Gleichman et al.

(10) Patent No.: US 8,781,202 B2
(45) Date of Patent: Jul. 15, 2014

(54) TUMOR CLASSIFICATION BASED ON AN ANALYSIS OF A RELATED ULTRASONIC ATTENUATION MAP

(75) Inventors: Sivan Gleichman, Haifa (IL); Eugene Walach, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 13/558,372

(22) Filed: Jul. 26, 2012

(65) Prior Publication Data

US 2014/0029817 A1 Jan. 30, 2014

(51) Int. Cl.
*G06K 9/00* (2006.01)
*A61B 8/00* (2006.01)

(52) U.S. Cl.
USPC ............................ 382/131; 382/224; 600/437

(58) Field of Classification Search
CPC .................................... G06K 9/00; A61B 8/00
USPC ......... 382/100, 103, 106–107, 128–134, 162, 382/168, 173, 181, 190, 224, 232, 254, 274, 382/276, 291, 305, 312; 600/447, 437; 378/4, 21
See application file for complete search history.

(56) References Cited

U.S. PATENT DOCUMENTS

| | | | | |
|---|---|---|---|---|
| 5,627,906 | A | * | 5/1997 | Walach ........................ 382/128 |
| 5,806,521 | A | * | 9/1998 | Morimoto et al. ............ 600/447 |
| 7,025,725 | B2 | | 4/2006 | Dione et al. |
| 2003/0095692 | A1 | * | 5/2003 | Mundy et al. ................. 382/128 |
| 2006/0078182 | A1 | * | 4/2006 | Zwirn et al. .................. 382/128 |
| 2006/0241431 | A1 | | 10/2006 | Kamiyama |
| 2009/0247869 | A1 | * | 10/2009 | Rambod et al. ............... 600/437 |
| 2010/0266179 | A1 | | 10/2010 | Ramsay et al. |

FOREIGN PATENT DOCUMENTS

| | | |
|---|---|---|
| EP | 882426 | 3/2003 |
| EP | 2359745 | 8/2011 |

OTHER PUBLICATIONS

Chenga et al., "Automated breast cancer detection and classification using ultrasound images: A survey", Journal Pattern Recognition, vol. 43, Issue 1, pp. 299-317, Jan. 2010.
Nover et al., "Modern Breast Cancer Detection: A Technological Review", International Journal of Biomedical Imaging, 2009.
Sehgal et al., "A Review of Breast Ultrasound", Journal of Mammary Gland Biology and Neoplasia 11(2), pp. 113-123, 2006.
Timothy A. Bigelow, "Estimation of Ultrasound Tissue Attenuation Along the Propagation Path by Applying Multiple Filters to the Backscattered Echoes", 2009 IEEE International Ultrasonics Symposium, IUS 2009, Sep. 2009.
Walach et al., "Local tissue attenuation images based on pulsed-echo ultrasound scans", IEEE Transactions on Biomedical Engineering, vol. 36, No. 2, Feb. 1989.

(Continued)

*Primary Examiner* — Seyed Azarian (57) ABSTRACT

A computerized method of classifying at least one suspicious region of interest (ROI) in an ultrasonic attenuation image mapping tissue of a patient. The method comprises receiving an US image of an tissue, identifying a suspicious region of interest (ROI) in the US image, generating an attenuation map of the suspicious ROI, measuring, according to an analysis of the attenuation map, at least one attenuation feature of at least one of the suspicious ROI and at least one sub region in the suspicious ROI, and classifying the suspicious ROI according to the at least one attenuation feature.

19 Claims, 11 Drawing Sheets
(3 of 11 Drawing Sheet(s) Filed in Color)

(56) References Cited

OTHER PUBLICATIONS

Walach et al., "Quantitative tissue characterization based on pulsed-echo ultrasound scans", IEEE Transactions on Biomedical Engineering, vol. 33, No. 7, Jul. 1986.

Sheng-Wen Huang and Pai-Chi Li,, "Ultrasonic Computed Tomography Reconstruction of the Attenuation Coefficient Using a Linear Array", IEEE Transactions on Ultrasonics, Ferroelectrics and Frequency Control, vol. 52, Issue: 11, pp. 2011-2022, Nov. 2005.

Chang et al., "Attenuation Measurements for Ultrasonic Breast Imaging: Comparisons of Three Approaches" Ultrasonics Symposium, 2008. IUS 2008. IEEE, pp. 1306-1309, Nov. 2-5, 2008.

* cited by examiner

```
function res=analyze_tumor(alpha_map,im,Tumor)
%%%parameters
MinIntensity=0.0005; %attenuation below this value is regarded as 0
MinMaxIntensity=0.002; %threshold for the maximum intensity (in the smoothed
attenuation)
imhmaxTh=0.005;
MinArea=500; %Minimum blob area
edgeTh=0.3;
uniform_th=0.53; % the part of the tumor that need to be uniform in order
for it to be benign
areaTh=4000;
%%%
%%%utilities
dim=size(alpha_map);
[~,Y] = meshgrid(1:dim(2),1:dim(1));
e = edge(im,'canny',edgeTh);
e=imdilate(e,ones(15,1)); %edge map
inner_Tumor=Tumor; %the original mark of the tumor
cc=regionprops(inner_Tumor,'BoundingBox');
W=cc(1).BoundingBox(3); %width of the original tumor
H=cc(1).BoundingBox(4); %height of the original tumor
above=imdilate(edge(inner_Tumor),strel('disk',5)); %the upper part of the
tumor
above(round(cc(1).BoundingBox(2)+0.2*cc(1).BoundingBox(4)):end,:)=0;
Tumor=imdilate(Tumor,strel('disk',20)); %dilation of the tumor
Tumor(Tumor&~inner_Tumor&(Y>min(Y(inner_Tumor(:)))+H))=0;%removing the lower
part of dilation
Tumor_area=bwarea(inner_Tumor);
Tumor_bound=imdilate(bwperim(Tumor),ones(15));
res=true(1); % the default is cancer
%%%
%%%marking too dark areas (dynamic range problem)
D=alpha_map==0 &im<0.005;
D(:,1:10)=0; %ignoring the left border of the image
D(:,end-9:end)=0; %ignoring the right border of the image
D(1:10,:)=0; %ignoring the top of the image
D=imclose(D,ones(2));
D=bwareaopen(D,400);
L=bwlabel(D);
LL=unique(L(end,:));
LL(LL==0)=[];
if ~isempty(LL)
    for l=1:length(LL)
        D(L==LL(l))=0; %ignoring blobs that touch the bottom of the image
    end
end
```

FIG. 7A

```
%%%
small_tumor=Tumor_area<areaTh ;
very_small_tumor=Tumor_area<areaTh/2 ;
neg_seround=bwarea(Tumor_bound & alpha_map<-MinIntensity)/
bwarea(Tumor_bound)>0.4 &&
median(alpha_map(Tumor_bound(:)&alpha_map(:)~=0))<-MinIntensity;
if small_tumor|| neg_seround
    MinMaxIntensity=0.001;
    imhmaxTh=0.004;
end
%%%smothing - making a carton-like attenuation map
h = fspecial('gaussian', 5, 2);
ind=[min(Y(Tumor)),max(Y(Tumor))]; %the y indexes of the tumor's area
if very_small_tumor
    ind(1)=max(1,ind(1)-10);
    ind(2)=min(dim(1),ind(2)+10);
end
I=zeros(dim);
sub_e=e(ind(1):ind(2),:);
sub_alpha=alpha_map(ind(1):ind(2),:);
sub_alpha(sub_e)=0; %ignoring attenuation on edges
sub_I=imfilter(sub_alpha,h,'same'); %gaussian filtering of the attenuation
sub_I=imhmax(sub_I,imhmaxTh); %suppressing local maxima below imhmaxTh
sub_I(sub_I<0)=0; %ignoring negative attenuation
sub_I(sub_I<0.001)=0;
I(ind(1):ind(2),:)=sub_I; %matrix of the size of the image
%%%

%%%binarization
BW=I>0 | D; %heigh attenoation or zero in the original image
BW=imclose(BW,strel('disk',2));
BW=imfill(BW,'holes');
BW=imopen(BW,strel('disk',5)); %breaking thin conections between blobs
if very_small_tumor
    BW=BW&imdilate(Tumor,strel('disk',10));
else
    BW=BW&Tumor;
end
BW=bwareaopen(BW,MinArea); %removing small blobs
%%%
%%%if most of the tumor is with zero graylevel - ignore it (a cyst)
if bwarea(D&inner_Tumor)/Tumor_area>0.6
    BW=zeros(size(BW));
end
%%%
```

FIG. 7B

```
%%% ignoring uniform and low attenuation
Th=0.0008;
t=inner_Tumor&I>MinIntensity;
t=bwareaopen(t,100);
m1=mode(I(t(:)));
t1=t&abs(I-m1)<Th;
if bwarea(t)/Tumor_area>uniform_th && max(I(t(:)))<0.0075 %65
    if (bwarea(t1)/bwarea(t)>uniform_th) && max(I(t(:)))<0.006
        BW=zeros(size(BW));
    else
        m2=mode(I(t(:)&~t1(:)));
        t2=t& abs(I-m2)<Th;
        if bwarea(t&(t1 | t2))/bwarea(t)>0.65 &&(sum(I(t(:))>0.006)<300
|| bwarea(t2)/bwarea(t)<0.1)
            BW=zeros(size(BW));
        end
    end
end
%%%
%%%if all blobs are ignored exit
if all(BW(:)==0)
    res=0;
    return
end
%%%
%%%removing blobs with too low attenuation
cc=regionprops(BW,I,'PixelIdxList','Area','ConvexImage','BoundingBox','Or
ientation','Solidity');
Num=length(cc);
to_keep=false(Num,1);
for i=1:Num
    if ~any(I(cc(i).PixelIdxList)>MinMaxIntensity)
        BW(cc(i).PixelIdxList)=0;
        continue
    end
    to_keep(i)=1;
end
%%%
%%%if all blobs are deleted exit
if all(BW(:)==0)
    res=0;
    return
end
%%%
%%%widening the remaining blobs
for i=1:length(cc)
    if to_keep(i)
        Z=zeros(size(BW));
        C=cc(i).ConvexImage;
        [~,Yc] = meshgrid(1:size(C,2),1:size(C,1));
        bc=bsxfun(@gt,Yc,max(C.*Yc));
```

FIG. 7C

```
        C(bc)=1;
Z(floor(cc(i).BoundingBox(2))+(1:cc(i).BoundingBox(4)),floor(cc(i).Boundi
ngBox(1))+(1:cc(i).BoundingBox(3)))=C;
        BW=BW | Z;
    end
end
%%%
test=Tumor&BW&(alpha_map>MinIntensity | D);
if ~very_small_tumor
    test=inner_Tumor&test;
end
r1= bwarea(test)/Tumor_area;
if bwarea(test)<4000 && bwarea(test)>0.1*bwarea(test)
    Th=0.004;
else
    Th=0.0015;
end
if r1<0.12
    BW=zeros(dim);
elseif r1<0.4
    if median(alpha_map(inner_Tumor&~test&alpha_map~=0))<0.0004 &&
median(alpha_map(test&~D))<Th
        BW=zeros(dim);
    else cc1=regionprops(imclose(BW,strel('disk',10)),'PixelIdxList','Area','Bound
ingBox');
        t=[cc1.BoundingBox];
        Bw=max(t(3:4:end));
        Bh=max(t(4:4:end));
        if Bw<W/2 || Bh<H/2
            E=alpha_map.*BW;
            r=round(0.25*sqrt(Tumor_area/pi));
          low=imerode(inner_Tumor,strel('disk',r))&(alpha_map<=-0.0017);
            Th=0.15;
            if  bwarea(low)/bwarea(E>MinIntensity|(D&inner_Tumor))>Th
                BW=zeros(dim);
            end
        end
    end
end
E=alpha_map.*BW;
if Tumor_area>6000 && ~neg_seround
    Th=0.006;
elseif small_tumor
    Th=0.002;
else
```

FIG. 7D

```
    Th=0.004;
end
r=round(0.25*sqrt(Tumor_area/pi)); t=E>0.01 &
imerode(inner_Tumor,strel('disk',r));
r=bwarea(E>Th)/bwarea(E>MinIntensity);
a=bwarea(E>Th);
if r<0.16 && a<4000 && (a<450 || r>0.03) && bwarea(t)<50
    BW=zeros(dim);
end
if all(BW(:)==0)
    E=false(dim);
    res=0;
    return
end
```

FIG. 7E

TUMOR CLASSIFICATION BASED ON AN ANALYSIS OF A RELATED ULTRASONIC ATTENUATION MAP

BACKGROUND

The present invention, in some embodiments thereof, relates to computer-aided diagnosis (CAD) and, more specifically, but not exclusively, to methods and systems of evaluating suspicious regions in an ultrasonic image of homogeneous or inhomogeneous tissue, such as the breast tissue.

Sonography is widely used for cancer diagnosis, for breast cancer. Worldwide, breast cancer comprises just under 30% of all diagnosed cancers in women. Mammography is currently the most common modality for screening and detecting breast cancer; however, a large portion of the breast lesions found in mammograms is benign. In order to improve the specificity, doctors often examine the suspicious lesions using ultrasound (US) imaging. Nevertheless, even when using both mammography and US, about 80% of the biopsies turn out to be benign.

During the last years, a number of cancer diagnostic tools have been developed, see Nover, A. B., Jagtap, S., Anjum, W., Yegingil, H., Shih, W., Shih, W., Brooks, A. D.: Modern Breast Cancer Detection: A Technological Review. International Journal of Biomedical Imaging (2009) and Sehgal, C. M., Weinstein, S. P., Arger, P. H., Conant, E. F.: A Review of Breast Ultrasound. Journal of Mammary Gland Biology and Neoplasia 11(2) (2006) 113-123.

Some of the cancer diagnostic tools include computer-aided diagnosis (CAD) systems. These systems typically compute a variety of breast image features to distinguish between malignant and benign tumors. The breast image features includes a shape of a suspicious region in the image (estimated as depicting a possible tumor), a texture of the suspicious region, and acoustic properties of the suspicious region.

SUMMARY

According to some embodiments of the present invention, there is provided a computerized method of classifying at least one suspicious region of interest (ROI) in an ultrasonic attenuation image mapping a tissue of a patient. The method comprises receiving an US image of a tissue, identifying a suspicious region of interest (ROI) in the US image, generating an attenuation map of the suspicious ROI, measuring, according to an analysis of the attenuation map, at least one attenuation feature of at least one of the suspicious ROI and at least one sub region in the suspicious ROI, and classifying the suspicious ROI according to the at least one attenuation feature.

According to some embodiments of the present invention, there is provided a system of classifying at least one suspicious region of interest (ROI) in an ultrasonic attenuation image mapping a tissue of a patient. The system comprises a processor, an input module which receives an US image of a tissue, ROI module which identifies a suspicious region of interest (ROI) in the US image, an attenuation mapping module which generates an attenuation map of the ROI, and a classification module which classifies the suspicious ROI according to at least one attenuation feature of at least one sub region in the suspicious ROI, the at least one attenuation feature being identified according to an analysis of the attenuation map.

According to some embodiments of the present invention, there is provided a computer program product for classifying at least one suspicious region of interest (ROI) in an ultrasonic attenuation image mapping a tissue of a patient. The computer program product includes a non-transitory computer readable storage medium, first program instructions to receive an US image of a tissue, second program instructions to identify a suspicious region of interest (ROI) in the US image, third program instructions to generate an attenuation map of the suspicious ROI, fourth program instructions to measure, according to an analysis of the attenuation map, at least one attenuation feature of at least one of the suspicious ROI and at least one sub region in the suspicious ROI, and fifth program instructions to classify the suspicious ROI according to the at least one attenuation feature. The first, second, third, forth, and fifth program instructions are stored on the non-transitory computer readable storage medium.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 7A-7E depicts a software code used to implement an analysis of attenuation features, according to some embodiments of the present invention.

DETAILED DESCRIPTION

The present invention, in some embodiments thereof, relates to computer-aided diagnosis (CAD) and, more specifically, but not exclusively, to methods and systems of classifying suspicious regions in an ultrasonic image of a tissue.

According to some embodiment of the present invention, there are provided methods and systems of classifying an homogeneous or inhomogeneous tissue, such as a breast tissue, thyroid tissue, colon tissue, and prostate tissue, depicted in a suspicious region of interest (ROI) of an ultrasonic (US) image, such as a B-scan image, by generating an attenuation map of the ROI and analyzing one or more attenuation features extracted from the attenuation map. The ROI, which may be two dimensional or volumetric, may be marked by a user and/or automatically identified in the US image.

Optionally, the analyzed features are related to dimensions, attenuation values, and homogeneity of attenuation values in sub regions in the ROI. These features are indicative of potential patterns of benign and/or malignant tumors in the tissue imaged in the ROI.

Optionally, the attenuation map is generated by calculating attenuation pixel values, optionally while taking into account the values of neighboring pixels.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
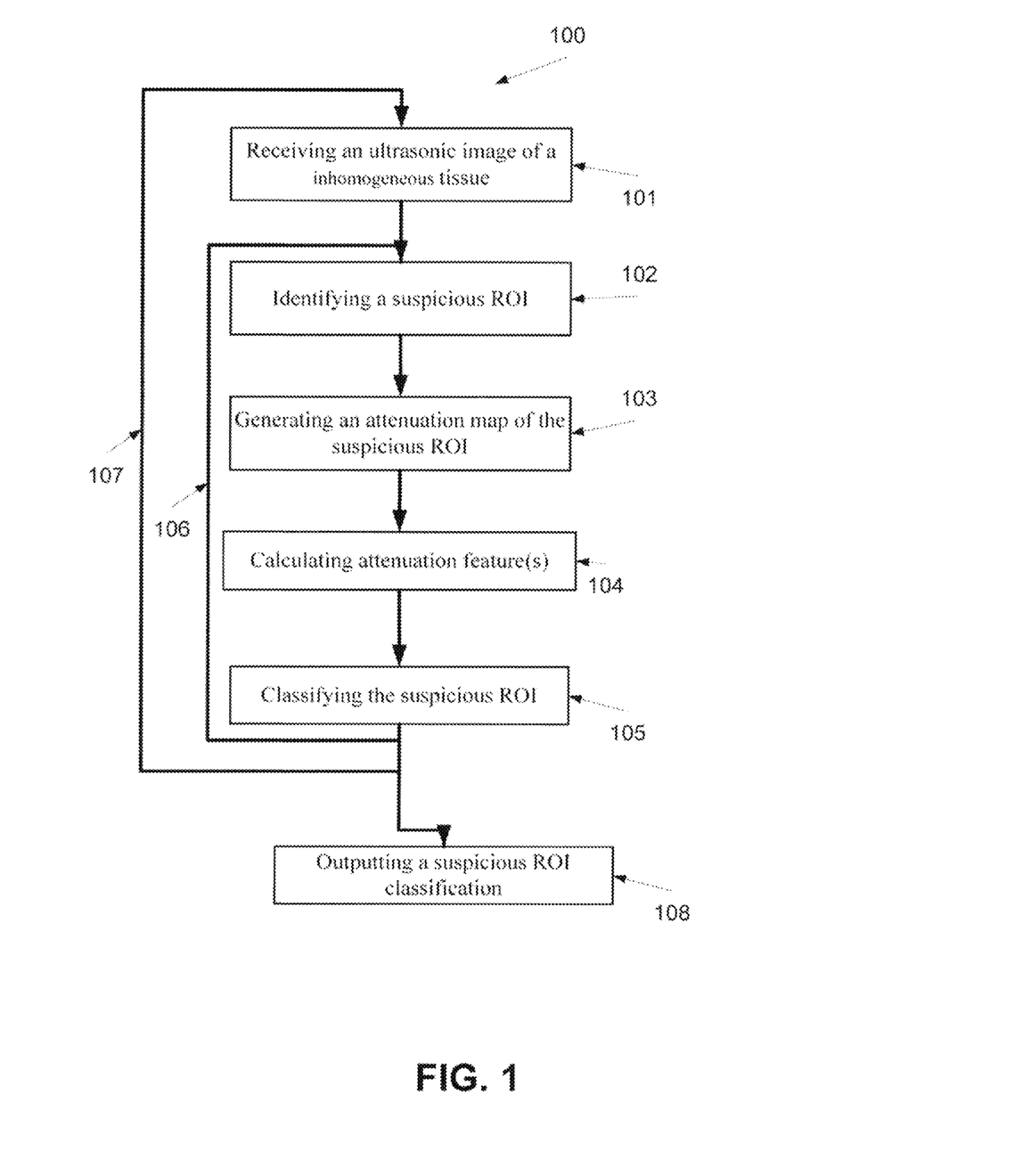
FIG. 1 is a flowchart of a method of classifying one or more suspicious ROIs in an US image mapping homogeneous or inhomogeneous tissue of a patient based on an analysis of ultrasonic attenuation features, according to some embodiments of the present invention.

Reference is now made to FIG. 1, which is a flowchart of a method 100 of classifying one or more suspicious ROIs based on an analysis of attenuation features in an US image mapping a tissue with homogeneous or inhomogeneous ultrasound radiation absorption, for brevity referred to herein as an inhomogeneous tissue, according to some embodiments of the present invention. The attenuation features are features of the suspicious ROI and/or subregions thereof (also referred to as blobs). These attenuation features are optionally extracted from an attenuation map of the suspicious ROI.

Figure 2:
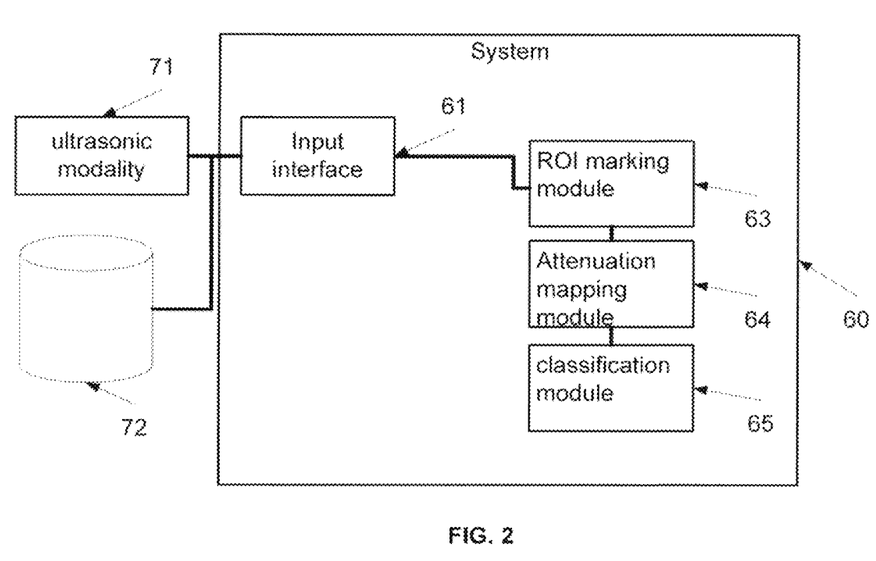
FIG. 2 is a schematic illustration of components of a system of classifying ROI(s) in an ultrasonic image mapping homogeneous or inhomogeneous tissue, for example by implementing the method depicted in FIG. 1, according to some embodiments of the present invention.

Reference is also made to FIG. 2, which is a schematic illustration of components of a system of classifying one or more ROIs in an ultrasonic image mapping inhomogeneous tissue, such as a breast tissue, thyroid tissue, colon tissue, and prostate tissue, for example by implementing the method depicted in FIG. 1, according to some embodiments of the present invention. As shown, software components include an input interface 61 for receiving an ultrasonic image from an ultrasonic modality 71 and/or a repository 72, optionally over a network, an ROI module 63, an attenuation mapping module 64, and a classification module 65.

The ultrasonic modality 71 is optionally a B-scan ultrasonography modality that generates ultrasonic images based on backscattering.

The methods and systems are based on analysis of acoustic features, namely the acoustic tissue attenuation measurements which are used to distinguish between malignant and benign tissues. The tissue attenuation is calculated using transmission of ultrasound (US) in a tomographic manner.

First, as shown at 101, an ultrasonic (US) image of an inhomogeneous tissue, such as a breast tissue is provided, for example from the ultrasonic modality 71, for instance a B-scan modality and/or from the repository 702, for instance a medical database. The US image is optionally a conventional B-scan image that is captured without modifying the image acquisition process and/or used hardware.

Figure 4A:
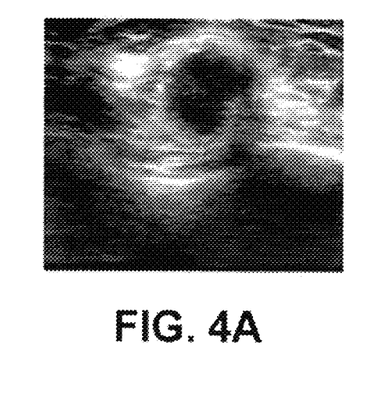
FIGS. 4A-4C are an US image, an US image with a marked manually suspicious ROI, and an attention map that is generated according to the suspicious ROI that is depicted in FIG. 4B, according to some embodiments of the present invention.
Figure 4B:
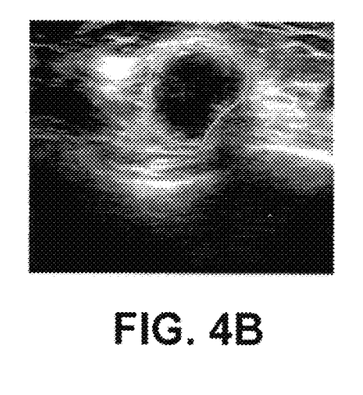

Now, as shown at 102, a suspicious ROI is identified in the US image. The suspicious ROI may be manually marked by a physician and/or operator. For example, the ROI marking module 63 is set to present a graphical user interface (GUI) that allows a user to mark the ROI on a presentation of the US image on a display of a client terminal, such as a desktop, a laptop, a tablet, and/or the like, for example by drawing a line therearound, for instance see line depicted in FIG. 4B on the US image presented in FIG. 4C. In another embodiment, the ROI is identified automatically by image processing of the US image, see for example, a survey about segmentation in US images: Noble and Boukerroui, "Ultrasound Image Segmentation: A Survey", IEEE TRANSACTIONS ON MEDICAL IMAGING, VOL. 25, NO. 8, AUGUST 2006

Now, as shown at 103, the marked ROI, and optionally of an area therearound, is analyzed to create an attenuation map, for example by the attenuation mapping module 64. Optionally, the attenuation map is created by calculating a local attenuation value of each pixel in the ROI. The local attenuation value is optionally estimated for each pixel according to a surrounding block. The attenuation the block is assumed to be uniform, optionally except for outliers (e.g. where pixels significantly differ from a central pixel of the block), which are removed.

Optionally, the attenuation map is presented, for example on the display. The attenuation map allows physicians to distinguish between benign and malignant tumors and thus reduce the number of redundant biopsies currently being carried out.

Optionally, the attenuation map is created as follows:
For each pixel in and optionally around the ROI:
defining a surrounding block size L×P;
defining a mask of a surrounding block having the surrounding block size and containing the pixel and a plurality of pixels therearound, for example so that the pixel is located at the center of the surrounding block;
estimating a block attenuation value of the surrounding block according to attenuation values of pixels in the mask; and
assigning the block attenuation value as the attenuation map value of the pixel.

Optionally, the block attenuation value is a block average attenuation that is computed using a least squares method.

Optionally, the intensity of a pixel in the $n^{th}$ column and $m^{th}$ row of US image is defined as follows:

$$E_{m,n} = E_0 \sigma_{m,n} \exp\left(-2\Delta \sum_{k=1}^{m} \alpha_{k,n}\right) \quad \text{Equation 1}$$

where $E_0$ denotes an initial amplitude, $\Delta$ denotes a size of the pixels, and $\sigma_{m;n}$; $\alpha_{k,n}$ respectively denotes the backscattering and attenuation coefficients. Without loss of generality it is assumed that $\Delta=1$. This is equivalent to simply changing the unit of measure of the attenuation.

$\alpha_{k,n}$ is estimated per pixel in, and optionally around, the suspicious ROI. The attenuation and backscattered coefficients are assumed as constant in a small vicinity of each pixel. As described above, the vicinity is defined as a surrounding block having L×P pixels around each pixel, for example, 65×17 pixels. If the attenuation is uniform in this block, then Equation 1 is reduced to:

$$E_{j,i} = E_{ie}^{-2(j-1)\alpha}$$

where $E_{j,i}$ denotes an intensity in the (j,i) pixel of the block and $\alpha$ denotes a constant attenuation of the pixels of the block.

Optionally, a mask is used to determine where pixels have constant attenuation. Optionally, a mask is identified for all in-range pixels, for example all pixels in the block with intensity within about 3 decibel (dB) proximity to the central pixel. Then, peripheral connected nonzero pixels multi dimensional object, referred to herein as nonzero blobs, are removed from the mask. For example, any nonzero blob whose distance from a main blob exceeds 4 pixels is removed.

Since the mask indicates a subregion with homogeneous attenuation, the model in Equation 2 holds for all pixels indicated by the mask. Therefore, a cost function may be defined to be the sum over all pixels of the squared differences of the block where the constant attenuation assumption is reasonable. Then, Equation 2 is applied only to pixels on this mask.

Figure 3A:
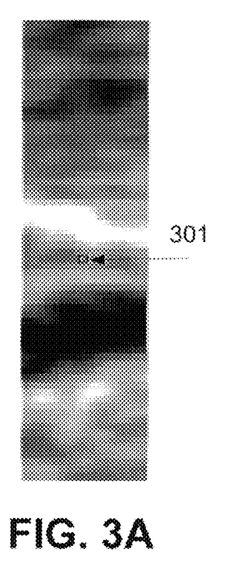
FIGS. 3A-3C are images of an exemplary block around a certain pixel, a mask applied on the exemplary block, and a processed mask after peripheral blobs are removed, according to some embodiments of the present invention.
Figure 3B:
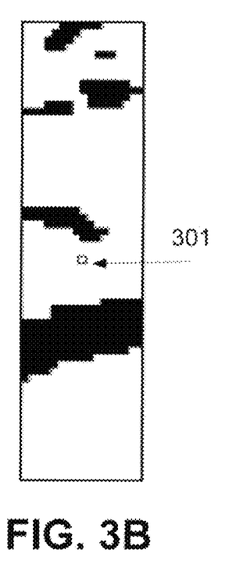
Figure 3C:
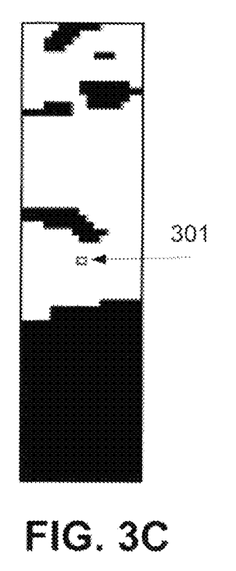

FIGS. 3A-3C are images of an exemplary block around a certain pixel 301, a mask applied on the exemplary block, and a processed mask after peripheral blobs are removed, see the following:

$$C(E_i, \alpha) = \sum_{i=1}^{P} \sum_{j \in \Omega_i} (E_{j,i} - E_i e^{-2(j-1)\alpha})^2 \quad \text{Equation 3}$$

where $\Omega_i$ denotes the $i^{th}$ column of the mask. The goal is to find $E_i$ and $\alpha$ that minimize this cost function. Optionally, the solution is limited to its first order approximation. This limitation is appropriate under the assumption that $\alpha \ll 1$ such that the exponential in Equation 3 is small. Since the attenuation value of most biological tissues is rarely above 0.01 Nepers per pixel, this assumption is valid. The first order approximation of Equation 3 is:

$$C(E_i, \alpha) = \sum_{i=1}^{P} \sum_{j \in \Omega_i} (E_{j,i} - E_i(1 - 2(j-1)\alpha))^2 \qquad \text{Equation 4}$$

where $k_i$ denotes a number of nonzero pixels on the $i^{th}$ column of the mask, and define the following:

$$a_i = \frac{2}{k_i} \sum_{j \in \Omega_i} (j-1),$$

$$b_i = \frac{1}{k_i} \sum_{j \in \Omega_i} E_{j,i},$$

$$c_i = \frac{1}{k_i} \sum_{j \in \Omega_i} (j-1)E_{j,i} - a_i b_i.$$

Using this notation it is easy to see that setting to zero the derivative of $C(E_i; \alpha)$ according to $E_i$ and using first order approximation yields:

$$\hat{E}_i = b_i - 2c_i\alpha$$

Substituting Equation 5 into Equation 4 and keeping only first order of $\alpha$ yields a simple square function of $\alpha$, whose single global minimum is in:

$$\hat{\alpha} = \frac{\sum_{i=1}^{P} D_i^T B_i}{\sum_{i=1}^{P} B_i^T B_i} \qquad \text{Equation 6}$$

where $\Omega_{(j,i)}$ denotes $(j,i)$ pixel in the mask and $$D_i = (b_i - E_{1,i}, \ldots, b_i - E_{L,i})^T, B_i = 2(\Omega_{1,i}c_i, \ldots, \Omega_{L,i}(c_i - (L-1)b_i)\ldots)^T.$$

Figure 4C:
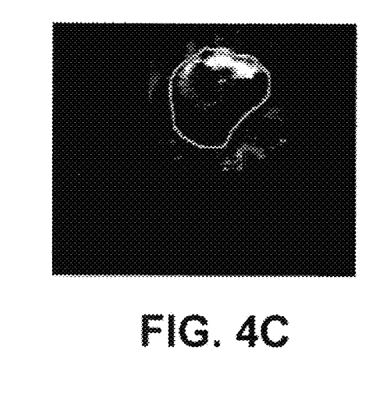
Figure 5A:
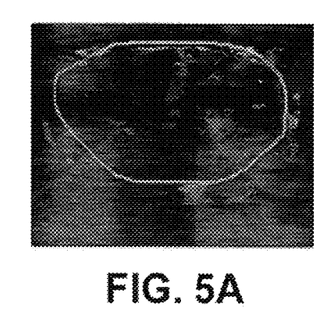
FIGS. 5A-5D are examples of attenuation maps of ROIs which depict benign tumors.
Figure 5B:
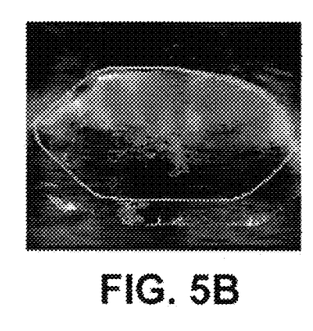
Figure 5C:
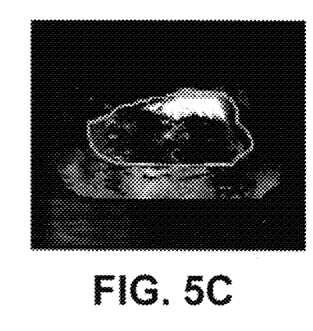
Figure 5D:
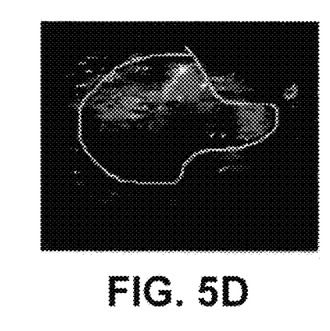
Figure 5E:
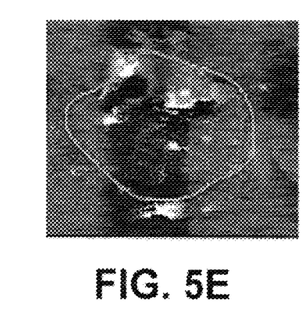
FIGS. 5E-5H are examples of attenuation maps of ROIs which depict malignant tumors.
Figure 5F:
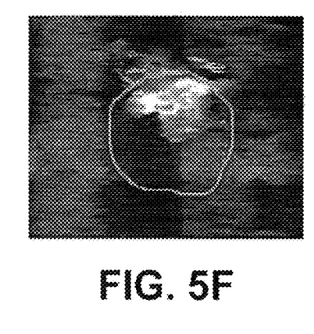
Figure 5G:
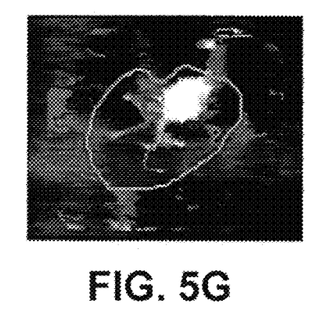
Figure 5H:
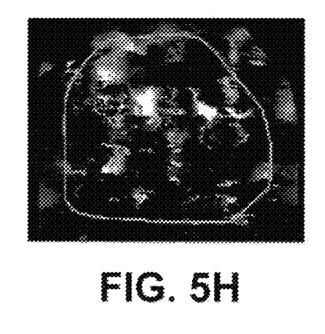

An estimated attenuation value $\hat{\alpha}$ is assigned only to the central pixel and not to the entire block. Performing this calculation for each pixel in and around the ROI yields the attenuation map. For example, FIG. 4C is an image of an attention map that is generated according to the suspicious ROI that is marked by the physician in FIG. 4B on the US image presented in FIG. 4A.

Now, as shown at 104, one or more attenuation features of the suspicious ROI and/or subregions in the suspicious ROI may be calculated according to the attenuation map. Optionally, the attenuation features are of one or more sub regions of the suspicious ROI.

Reference is now made to FIGS. 5A-5D which are examples of attenuation maps of ROIs which depict benign tumors and to FIGS. 5E-5H which are examples of attenuation maps of ROIs which depict malignant tumors. Each ROI is encircled by a line. As may be observed in FIGS. 5E-5H, malignant tumors have relatively large patches of high attenuation, while the overall structure is inhomogeneous. As depicted in these figures, due to distortions such as time gain compensation (TGC), the attenuation map is relative rather than absolute where zero attenuation is expected for healthy tissue and higher attenuation values for malignant tumors. It should be noted that the same approach may be used for images acquired without TGC.

Reference is also made to a set of features that may be used to classify the suspicious ROI:

TABLE 1

| Description | The Feature | |
|---|---|---|
| A small portion may indicate a benign tumor. | The portion of the ROI that is covered by sub-regions of relatively high attenuation (i.e. sub-regions (blobs) of high attenuation are identified in the ROI and then the ratio between their areas and the area of the ROI - the tumor-is calculated. | 1 |
| A large portion may indicate a benign tumor, since malignant tumors usually have inhomogeneous structure | The portion of the ROI that is covered by sub regions with uniform attenuation value. For example a ratio between the area of a sub-region with uniform attenuation (such as in FIG. 6D) and the area of the tumor (the ROI) is calculated. | 2 |
| Malignant tumors tend to have higher attenuation. | The maximal attenuation in the ROI. | 3 |
| A small portion may indicate a benign tumor. | The portion of the ROI with attenuation close to the maximum from feature 3. | 4 |
| A large portion may indicate a benign tumor | The portion of the ROI with negative attenuation. | 5 |

Figure 6A:
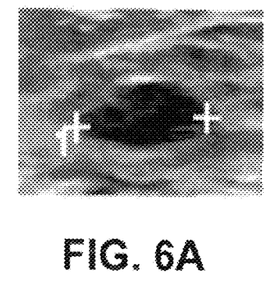
FIGS. 6A-6D are US image segment depicting a benign tumor and correspond with a suspicious ROI, an attenuation map with line marks indicating tumor's boundaries, a smoothed version of the attenuation map, and a smoothed version of the attenuation map with colored regions representing uniform attenuation regions, according to some embodiments of the present invention.
Figure 6B:
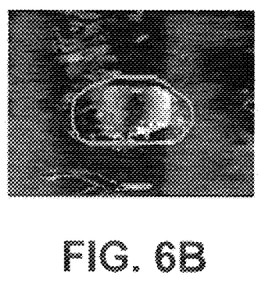
Figure 6C:
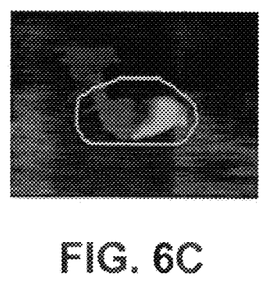
Figure 6D:
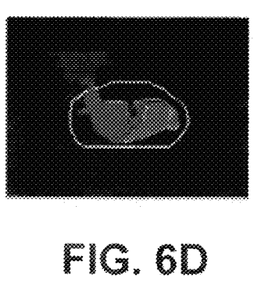
Figure 7B:
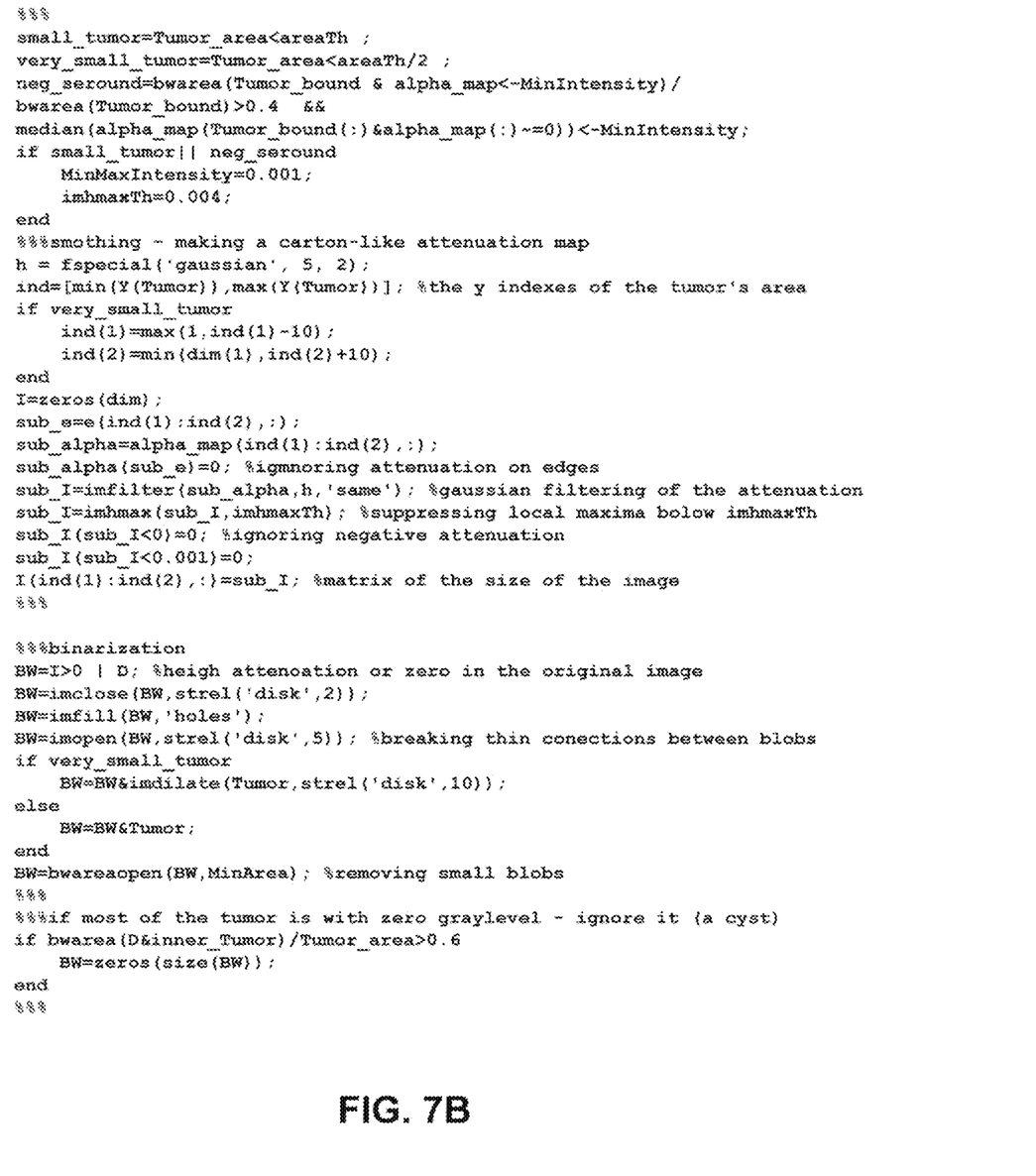
Figure 7C:
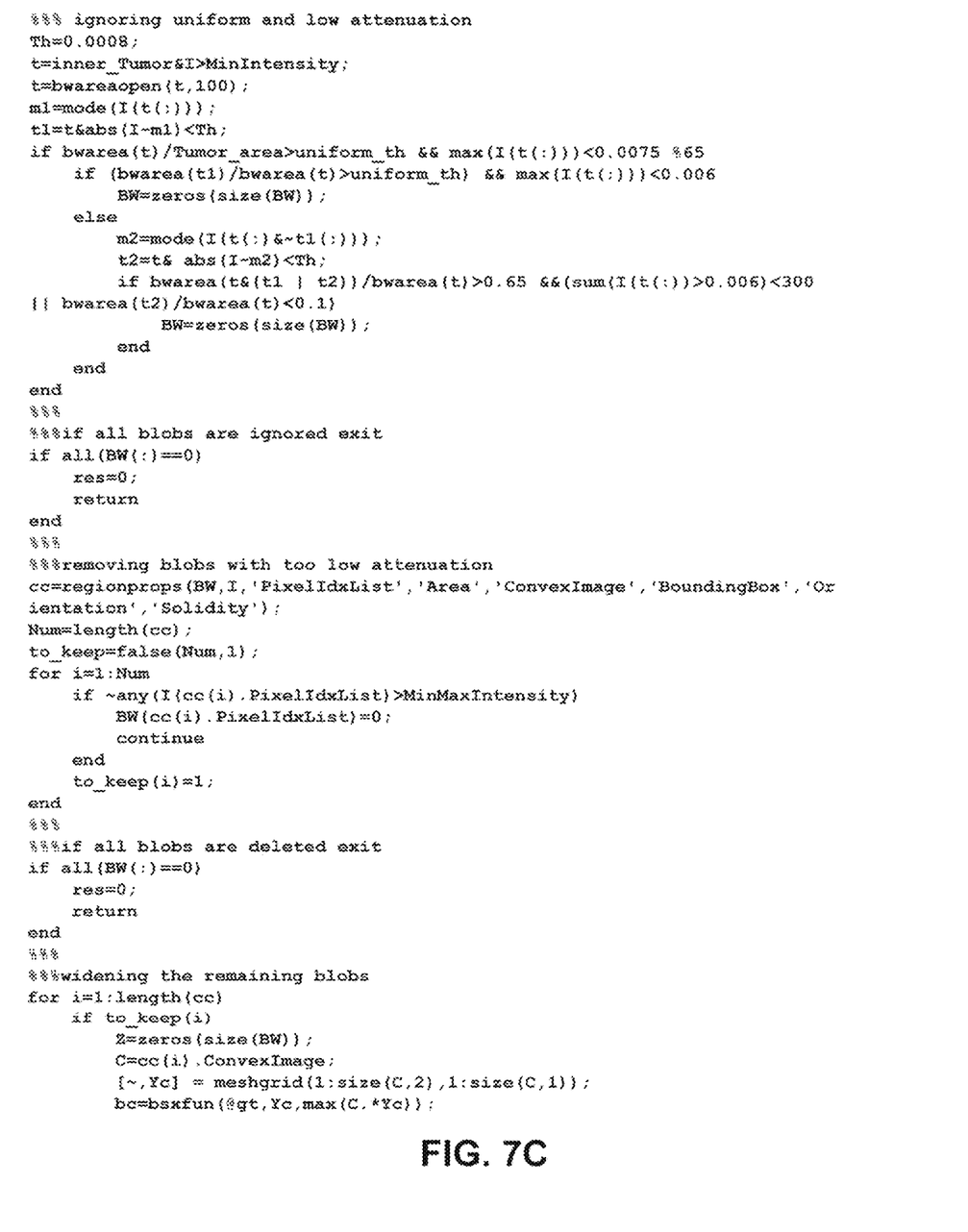
Figure 7D:
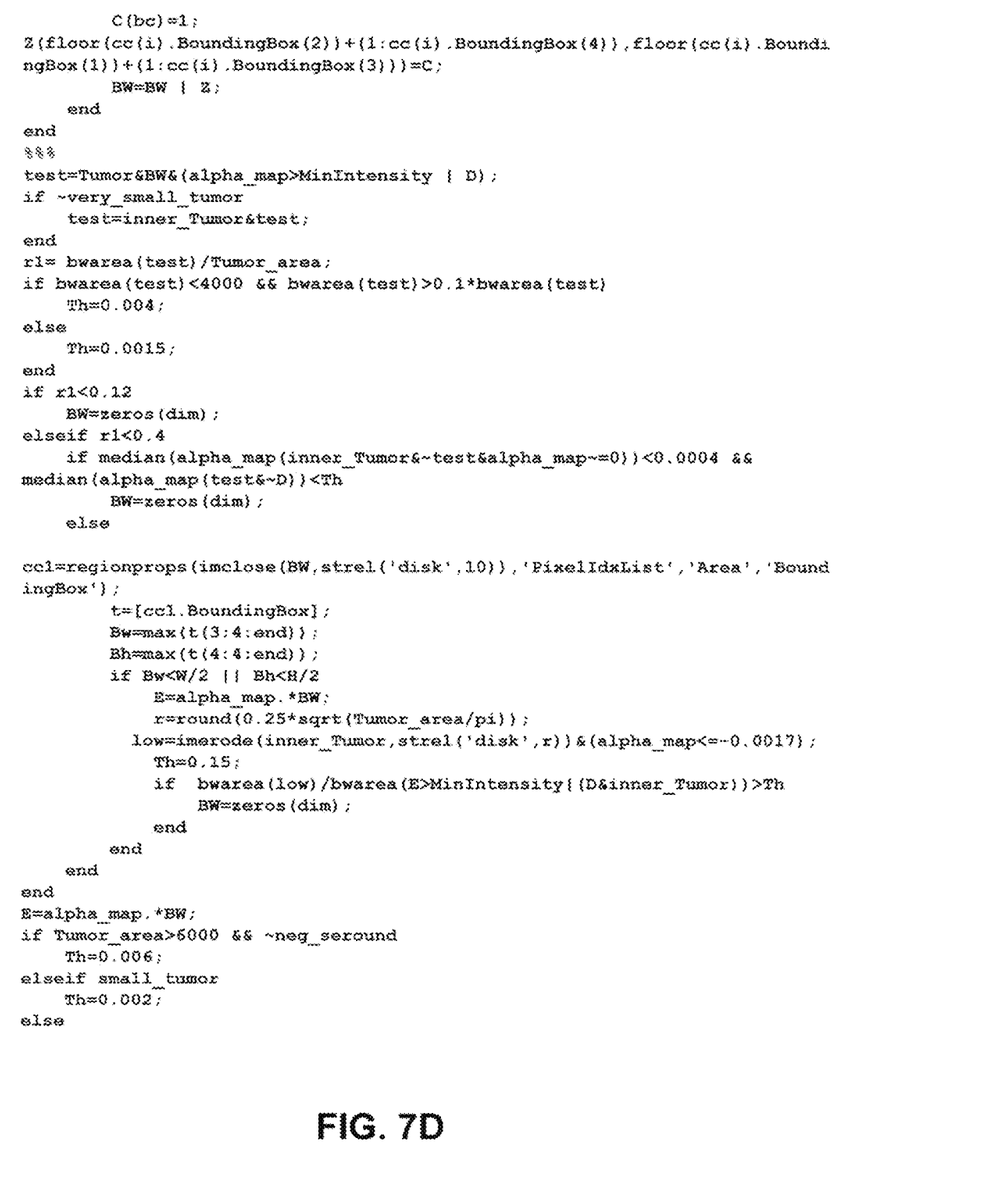
Figure 7E:
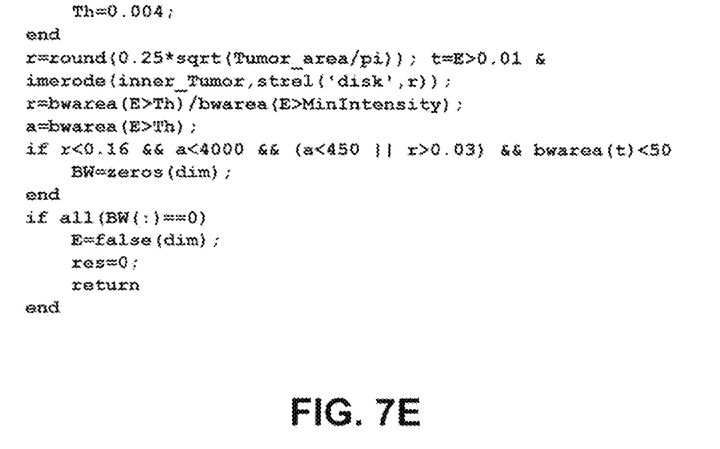

Optionally, in order to quantify features 1 and 2 the attenuation map is processed using H-maxima transform which suppresses mild maxima. For feature number 1, the sub regions of relatively high attenuation are identified by applying a threshold, optionally fixed, for example ($10^{-3}$ Nepers/pixel) on the smoothed map, while filtering blobs with too small area. For feature number 2, two regions with uniform attention in the smoothed map are optionally analyzed. The first region consists of all the pixels whose value equals the median value of the smoothed attenuation map and the second region is defined similarly as all the pixels whose value equals the median of the pixels that are not in the first region. FIGS. 5A-5D are exemplary images of a suspicious ROI in an US image and respective uniform attenuation regions. FIG. 6A is an US image segment depicting a benign tumor and correspond with a suspicious ROI, FIG. 6B depicts the attenuation map where the depicted line marks the tumor's boundaries, and FIGS. 6C and 6D are a smoothed version of the attenuation map, and a smoothed version of the attenuation map with colored regions representing uniform attenuation regions.

Optionally, feature 3 is identified according to the attenuation values in the image. Feature number 4 examines the area where the attenuation is close to the maximum. As an outcome, artifacts are filtered while maximum values which occur only in small number of isolated pixels are ignored.

Optionally, the features depend on the size of the ROI. For instance, the minimal acceptable intensity for feature 3 and the parameter of the H-maxima transform are smaller when dealing with smaller tumors. This is due the fact that for small tumors the attenuation estimation accuracy is lower.

Now, as shown at 105, the suspicious ROI is classified according to the one or more features, for example according to a combination features. Optionally, the features are weighted. The classification may be binary, for example distinguishing between malignant and benign tumors. The classification may be a score indicative of a probability the tumor is malignant and/or benign. Optionally, the classification is presented to the user, for example as an overlay on a display of the US image.

Optionally, as shown at 106, the process depicted in 102-105 is repeated iteratively, each time on another suspicious ROI. In such embodiments multiple suspicious ROI in an image may be separately analyzed.

FIGS. 7A-7E depicts a software code used to implement the above analysis of attenuation features, according to some embodiments of the present invention.

According to some embodiments of the present invention, the US image is a three dimensional (3D) image, for example imaged using a 3D US modality. In such embodiments, the suspicious ROI is a volumetric ROI having width, length, and depth is identified, either automatically, semi automatically (e.g. automatic identification which requires the user approval), or manually, by the physician and/or another operator.

Optionally, as shown at 107, the process depicted in 102-105 and optionally 106 is repeated iteratively, each time on another slice image of the suspicious volumetric ROI. In such embodiments multiple suspicious ROI in an image may be separately analyzed. In another embodiment, 103 is preformed separately on each slice while segmentation, features identification and calcification is preformed on a volumetric suspicious ROI that covers the 3D tumor.

Optionally, as shown at 108, the classification of the one or more suspicious ROIs is presented to a user, for example on a display, for instance as an overlay of information that is presented with the respective US image and/or as a report that is produced for the user. Optionally, the same analysis is performed for several views of the same tumor with voting being performed in order to combine results for each view.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems will be developed and the scope of the term a processor, a module, an US image, B-scan, and an ultrasonic modality is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized method of classifying at least one suspicious region of interest (ROI) in an ultrasonic attenuation image mapping a tissue of a patient, comprising:
    receiving an ultrasound (US) image of a tissue;
    identifying a suspicious region of interest (ROI) in said US image;
    generating an attenuation map of said suspicious ROI;
    measuring, according to an analysis of said attenuation map, at least one attenuation feature of at least one of said suspicious ROI and at least one sub region in said suspicious ROI, wherein said at least one attenuation feature is a ratio between the area of said suspicious ROI and a plurality of sub regions thereof with a pixel attenuation value above a predefined level; and
    classifying said suspicious ROI according to said at least one attenuation feature.

2. The computerized method of claim 1, wherein said tissue is an inhomogeneous tissue having inhomogeneous ultrasound radiation absorption.

3. The computerized method of claim 1, wherein said at least one attenuation feature is a dimension of a portion of said suspicious ROI that includes a plurality of sub regions with a relatively uniform pixel attenuation value.

4. The computerized method of claim 1, wherein said at least one attenuation feature is a maximal attenuation value of a portion of said suspicious ROI.

5. The computerized method of claim 1, wherein said at least one attenuation feature is a dimension of a portion of said suspicious ROI that includes a cumulative pixel attenuation value above a maximal attenuation value of a pixel of said suspicious ROI.

6. The computerized method of claim 1, wherein said at least one attenuation feature is a dimension of a portion of said suspicious ROI that includes a negative cumulative pixel attenuation value.

7. The computerized method of claim 1, wherein said at least one attenuation feature is THE size of said suspicious ROI.

8. The computerized method of claim 1, wherein said generating comprises, for each pixel of said suspicious ROI:
    defining a surrounding block containing the respective pixel and a plurality of pixels therearound, and
    assigning the respective pixel with an attenuation map value calculated according to a combination of attenuation values of said plurality of pixels.

9. The computerized method of claim 1, wherein said attenuation map maps attenuation level of some pixels of said suspicious ROI relative to other pixels of said suspicious ROI.

10. The computerized method of claim 1, wherein said generating comprises generating said attenuation map to map attenuation in said suspicious ROI and in an area therearound.

11. The computerized method of claim 1, wherein said identifying comprises marking said suspicious ROI by a user.

12. The computerized method of claim 1, wherein said US image is acquired by a B-scan ultrasonography modality.

13. The computerized method of claim 1, wherein said measuring comprises calculating said at least one attenuation feature by:
    applying an attention threshold to identify a plurality of high attenuation sub regions in said suspicious ROI,
    calculating a plurality of sets each includes a plurality of features of another of said of said high attenuation sub regions,
    calculating said attenuation level variability measure by combining said plurality of sets.

14. The computerized method of claim 1, further comprising outputting a display presenting said classification to a user.

15. The computerized method of claim 1, wherein said US image is a three dimensional (3D) US image and said suspicious ROI is a suspicious 3D ROI; wherein said generating comprises generating an attenuation map for each of a plurality of slices of said suspicious 3D ROI; wherein said measuring is performed per said slice and said classifying is performed according to a combination of each said at least one attenuation feature of each said slice.

16. A system of classifying at least one suspicious region of interest (ROI) in an ultrasonic attenuation image mapping a tissue of a patient, comprising:
    a processor;
    an input module which receives an US image of a tissue;
    ROI module which identifies a suspicious region of interest (ROI) in said ultrasound (US) image;
    an attenuation mapping module which generates an attenuation map of said ROI; and
    a classification module which classifies said suspicious ROI according to at least one attenuation feature of at least one sub region in said suspicious ROI, said at least one attenuation feature being identified according to an analysis of said attenuation map, and wherein said at least one attenuation feature is a ratio between the area of said suspicious ROI and a plurality of sub regions thereof with a pixel attenuation value above a predefined level.

17. The system of claim 16, wherein said tissue is an inhomogeneous tissue having inhomogeneous ultrasound radiation absorption.

18. The system of claim 16, further comprising a display for presenting said classification in association with said US image.

19. A computer program product for classifying at least one suspicious region of interest (ROI) in an ultrasonic attenuation image mapping a tissue of a patient, comprising:
- a non-transitory computer readable storage medium;
- first program instructions to receive an ultrasound (US) image of a tissue;
- second program instructions to identify a suspicious region of interest (ROI) in said US image;
- third program instructions to generate an attenuation map of said suspicious ROI;
- fourth program instructions to measure, according to an analysis of said attenuation map, at least one attenuation feature of at least one of said suspicious ROI and at least one sub region in said suspicious ROI, wherein said at least one attenuation feature is a ratio between the area of said suspicious ROI and a plurality of sub regions thereof with a pixel attenuation value above a predefined level; and
- fifth program instructions to classify said suspicious ROI according to said at least one attenuation feature;
- wherein said first, second, third, fourth, and fifth program instructions are stored on said non-transitory computer readable storage medium.

* * * * *